May 20, 1952

C. E. BENNETT 2,597,222

ELECTRIC CABLE SYSTEM

Filed Jan. 9, 1948

INVENTOR.
CHARLES E. BENNETT
BY James G. Bethell
ATTORNEY

Patented May 20, 1952

2,597,222

UNITED STATES PATENT OFFICE 2,597,222

ELECTRIC CABLE SYSTEM

Charles E. Bennett, Ridgewood, N. J., assignor to The Okonite-Callender Cable Company, Incorporated, Paterson, N. J., a corporation of New Jersey Application January 9, 1948, Serial No. 1,446

8 Claims. (Cl. 174—10)

My invention is directed to an improvement in electric power cables, and has for one of its objects to provide an improved electric cable system of the type wherein several insulated conductors are drawn into a pipe line, the pipe being maintained filled with an insulating fluid, such as cable oil, under superatmospheric pressure.

Conventionally each conductor of such cable system is insulated with paper impregnated with an insulating fluid, shielding tape being applied about this insulation. Inasmuch as the conductors are drawn into the pipe line when installing the cable it becomes necessary to protect the insulation against injury during the drawing-in operation. The practice is to wrap armor wire about the insulation in a long pitch helix.

The cable is impregnated with fluid insulation before leaving the cable plant, so that it becomes necessary to protect the cable in transit to the installation site against loss of this fluid. For this purpose it is customary to enclose the cable in a temporary lead sheath, a rip cord being laid between the lead and the cable insulation, whereby the lead can be removed as the cable is being drawn into the pipe line. The expense incident to the armor wire and temporary lead sheath adds materially to the cost of the system, as will be appreciated by anyone skilled in this industry.

One of the objects of my invention is to provide a construction in this general type of cable system wherein the armor wire and temporary lead sheath are eliminated. My improved construction has another advantage as compared with the prior construction above referred to in that in the event of an electric fault in one phase of a three phase system for example, burning through to the other phases is prevented.

More specifically I apply a metal sheath to each conductor in place of the armor wire and temporary lead sheath used heretofore, this sheath having all of the advantages of the lead sheath so far as protecting the cable mechanically and against loss of fluid insulation in transit are concerned and having all of the advantages of the armor wire customarily used so far as facilitating pulling in of the conductors is concerned.

The metal sheath I employ is permanent as distinguished from the temporary lead sheath used heretofore, so that the expense incident to removal and disposition of the lead is eliminated.

In the prior construction above referred to it will be appreciated that when an electrical fault occurs in one phase of a three-phase system, for example, there is danger of the fault burning through to the other phases causing a fault in all three phases.

I eliminate this trouble with the present construction by encasing each conductor in a permanent metal sheath, so that an electrical fault in any one phase will be confined to that phase. A single phase fault is 1/1.73 of a three-phase fault so that by confining the fault to a single phase, the strain on the oil switch between the cable and transformer or generator is held to a minimum.

In the accompanying drawings.

Figure 1:
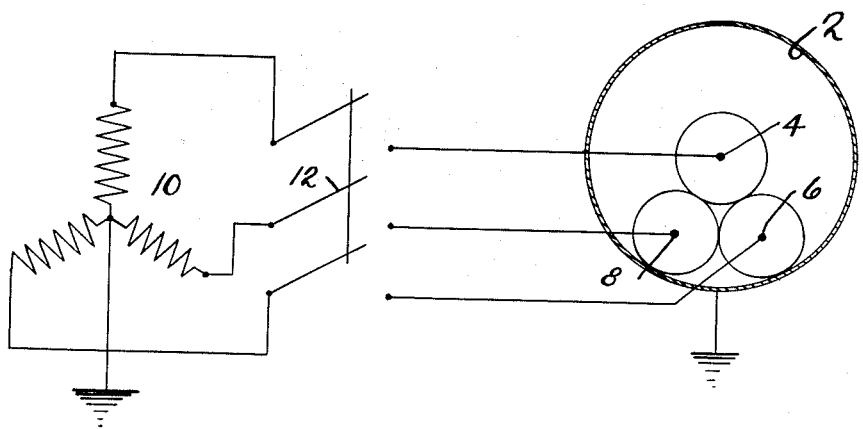
Fig. 1 is a schematic view of an installation embodying my invention.
Figure 2:
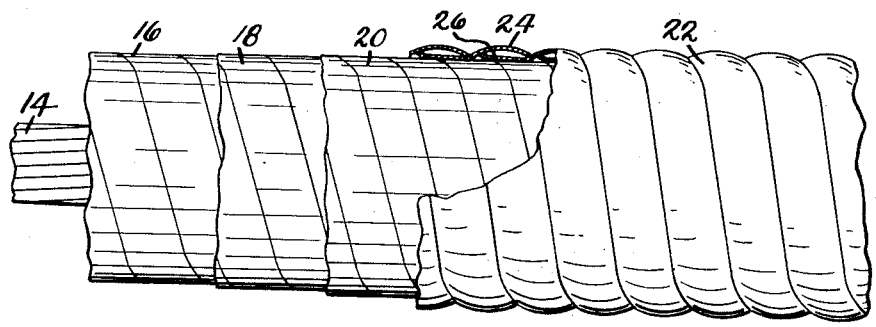
Fig. 2 is a side elevational view partially broken away of one of the cable conductors of Fig. 1.

Referring first of all to the schematic showing in Fig. 1, 2 designates a metal pipe line loosely enclosing a plurality of separately insulated and separately sheathed cable conductors 4, 6 and 8 constituting the three phases of a three-phase electric power cable system. In practice the system is sealed and the pipe line 2 is maintained filled with fluid insulation which is maintained under high pressure of the order of 200 to 225 pounds per square inch. 10 designates a transformer, generator or other source of power supplying energy to the cable, while 12 is the oil breaker switch between the cable and transformer.

The three phases 4, 6 and 8 are alike in construction, and each comprises a conductor 14, insulated with paper tape 16 which is wrapped helically about the conductor layer upon layer until the desired wall thickness has been built up.

Immediately about the insulation I apply electrostatic shielding tape 18. This tape, which may be copper, aluminum or other suitable metal tape, or metal-coated paper tape, is wrapped helically about the insulation with the edge of one turn abutting the adjacent edge of the next turn.

Over the shielding tape I apply one or more cushioning layers 20. This cushion may be composed of various non-metallic materials, such as varnished cambric, which is non-absorbent, or I may use asbestos fiber, glass wool, and the like which are fireproof.

Over the cushioning layer 20, if one be used, or directly about the shielding tape 18, if the cushioning layer be omitted, I apply a permanent metal sheath 22. This sheath may be composed of copper, bronze, aluminum, stainless steel, etc., and is made up of a tape of the metal selected.

Before the sheath 22 is applied the cable is evacuated of moisture, air and other gases and subjected to an impregnating operation thoroughly to fill the cable with fluid insulation.

As above mentioned the sheath 22 is made up of metal tape. This tape is wrapped helically about the cable and in this operation passes through forming dies which bends the tape outwardly throughout about half its width as illustrated at 24. This outward curved bend, it will be understood, extends continuously the entire length of the tape. In applying the tape the outwardly curved half portion of the tape is lapped over the remaining half portion 26 of the tape. This is a very substantial overlap, and provides a seal at the overlapped edges of the tape which in some instances will be sufficiently tight to prevent loss, to a detrimental extent, of fluid insulation while the cable is in transit. However, I prefer to employ a sealing material between the overlapping edges of the tape. A material which I have found satisfactory is a mixture of a polybutene sold commercially as Vistac a product of Advance Solvents of New York and a linear polymer of isobutylene sold commercially as Vistanex a product of Standard Oil Company of New York. A suitable mixture is 85 parts by volume of Vistac to 15 parts by volume of Vistanex. This material is of a heavy, sticky nature, and highly resistant to moisture absorption. The material is merely smeared upon the tape as the latter is being applied to the cable and in the finished sheath is compressed between the overlapped tape edges to provide a fluid tight seal, which effectively prevents the escape of fluid from the cable or the entry of moisture or other deleterious material into the cable.

It will now be apparent that each cable phase is jacketed in a flexible metal sheath, the overlap of the metal tape composing the sheath and the formation of the tape above described permitting sliding of adjacent tape wraps upon each other to allow the cable to flex sufficiently for handling and reeling without destroying the fluid tight seal at the tape overlaps. The sealing material mentioned distintegrates when the cable is operated.

From all of the foregoing it will be seen that I have provided an electric power cable system in which each phase of the cable is jacketed with a permanent flexible metal sheath so formed by helically wrapping a metal tape about the phase assembly as to provide a continuous corrugation on its exterior extending helically of the cable phase.

This sheath is strong enough to protect the cable mechanically against damage, is sealed so as to prevent the entry of moisture or other deleterious material to the cable interior and so as to prevent the escape of fluid insulation while the cable is in transit, and facilitates the drawing of the cable into the pipe line 2, at the same time protecting the cable insulation against damage in this operation.

The armor wire, the rip cord and temporary lead sheath used heretofore have been eliminated and a great deal of the expense incident to their use.

My improved construction has another advantage which has already been mentioned, namely should an electrical fault occur in any one of the three phases, the provision of the metal jacket for each phase will confine the fault to the one phase and prevent burning through the other phases to cause a three phase fault. Furthermore, a single phase fault is 1/1.73 of a three-phase fault, thus the strain on the switch 12 because of an electrical fault is much reduced as compared with prior construction in comparable types of electric power cables where each phase is unjacketed so far as any metal sheath is concerned.

It will be appreciated that the cushioning material 20 above referred to will prevent damage to the electrostatic shielding tape 18 and the paper insulation 16 from the jacket 22 when the cable is being flexed for reeling and other handling, and during the drawing in operation as the cable is being installed.

It is to be understood also that in operation of my improved cable system, the sealing material mentioned disintegrates, so that whether the same be used or not, the fluid insulation in the system being under superatmospheric pressure is free to move between the overlaps of the tape composing the jacket 22. In other words, the jacket does not constitute an impermeable wall between the main body of insulation in the pipe line 2 and the insulation 16.

I wish it to be further understood that changes may be made in the details of construction and arrangement of parts hereinabove described within the purview of my invention.

What I claim is:

1. An electric high tension conductor assembly for installation in a fluid-tight pipe line containing fluid insulation under superatmospheric pressure, said assembly comprising a conductor, fluid permeable insulation therefor, shielding at the surface of the insulation, fluid insulating material filling the permeable insulation, a cushioning layer over the said shielding, and an outer enclosing tight fitting jacket comprising imperforate metal tape wrapped helically tightly about the cushioning layer with the adjacent edges of adjacent convolutions of the tape overlapping, and a sealing material for sealing the jacket at the overlapped edges of the jacket tape to retain the fluid insulation within the jacket, said sealing material being of such a nature that it disintegrates when the conductor is placed in service thereby destroying the seal initially provided and permit of the passage of fluid insulating material between the overlapped edges of the metal tape.

2. An electric high tension conductor assembly for installation in a fluid-tight pipe line containing fluid insulation under superatmospheric pressure, said assembly comprising a conductor, fluid permeable insulation therefor, shielding at the surface of the insulation, fluid insulating material filling the permeable insulation, a cushioning layer of moistureproof material over the said shielding, and an outer enclosing tight fitting jacket comprising imperforate metal tape wrapped helically about the cushioning layer with the adjacent edges of adjacent convolutions of the tape overlapping, and a sealing material for sealing the jacket at the overlapped edges of the jacket tape to retain the fluid insulation within the jacket, said sealing material being of such a nature that it disintegrates when the conductor is placed in service to destroy the seal initially provided thereby and permit movement of the insulating fluid between the overlapped edges of the jacket tape.

3. An electric high tension conductor assembly for installation in a fluid-tight pipe line containing fluid insulation under superatmospheric pressure, said assembly comprising a conductor, fluid permeable insulation therefor, shielding at the surface of the insulation, fluid insulating material filling the permeable insulation, a cushioning layer of fireproof material over the said shielding, and an outer enclosing tight fitting jacket comprising imperforate metal tape wrapped helically tightly about the cushioning layer with the adjacent edges of adjacent convolutions of the tape overlapping, and a sealing material for sealing the jacket at the overlapped edges of the jacket tape to retain the fluid insulation within the jacket, said sealing material being of such a nature that the seal provided thereby will be broken when the conductor is placed in service to permit movement of the fluid insulating material between the overlapped edges of the jacket tape.

4. An electric high tension conductor assembly for installation in a fluid-tight pipe line containing fluid insulation under superatmospheric pressure, said assembly comprising a conductor, fluid permeable insulation therefor, shielding at the surface of the insulation, fluid insulating material filling the permeable insulation, a cushioning layer of fire and moistureproof material over the said shielding, and an outer enclosing tight fitting jacket comprising imperforate metal tape wrapped helically tightly about the cushioning layer with the adjacent edges of adjacent convolutions of the tape overlapping, and a sealing material for sealing the jacket at the overlapped edges of the jacket tape to retain the fluid insulation within the jacket, said sealing material being of such a nature that the seal provided thereby will be broken when the conductor is placed in service thereby to permit the fluid insulating material to pass between the overlapped edges of the jacket tape.

5. An electric high tension conductor assembly for installation in a fluid-tight pipe line containing fluid insulation under superatmospheric pressure, said assembly comprising a conductor, fluid permeable insulation therefor, shielding at the surface of the insulation, fluid insulating material filling the permeable insulation, a cushioning layer of asbestos over the said shielding, and an outer enclosing tight fitting jacket comprising imperforate metal tape wrapped helically tightly about the cushioning layer with the adjacent edges of adjacent convolutions of the tape overlapping, and a sealing material for sealing the jacket at the overlapped edges of the jacket tape to retain the fluid insulation within the jacket, said sealing material being of such a nature that the seal provided thereby will be broken when the conductor is placed in service thereby to permit the fluid insulating material to move between the overlapped edges of the metal tape.

6. An electric high-tension conductor assembly for installation in a fluid-tight pipe line containing fluid insulation under superatmospheric pressure, said assembly comprising a conductor, fluid permeable insulation therefor, shielding at the surface of the insulation, fluid insulating material filling the permeable insulation, a cushioning layer of glass fibers over the said shielding, and an outer enclosing tight fitting jacket comprising imperforate metal tape wrapped helically tightly about the cushioning layer with the adjacent edges of adjacent convolutions of the tape overlapping, and a sealing material for sealing the jacket at the overlapped edges of the jacket tape to retain the fluid insulation within the jacket, said sealing material being of such a nature that the seal provided thereby will be broken when the conductor is placed in service thereby to permit of the passage of fluid insulating material between the overlapped edges of the jacket tape.

7. A three-phase electric high-tension power cable installation comprising, in combination, a plurality of conductors; fluid-permeable insulation for each conductor; fluid insulating material filling the said fluid-permeable insulation; shielding at the surface of the permeable insulation of each conductor; a metal jacket comprising imperforate metal tape wrapped helically tightly about each conductor assembly, adjacent edges of adjacent convolutions of the tape being overlapped and interlocked to provide a substantially continuous, tight-fitting, enclosing jacket for each conductor assembly, to confine an electrical fault occurring in any one of the three phases to the phase in which it originated; a fluid-tight pipe, enclosing the conductors, of sufficiently large internal diameter to permit drawing the conductors into the pipe; and a body of fluid insulation under superatmospheric pressure between the jacketed conductors and the wall of the pipe; said metal tape at the overlap of one edge of each convolution with the adjacent edge of the next convolution being curved outwardly of the jacket to provide a helically extending corrugation throughout the length of the jacket; the last-mentioned body of fluid insulation being accessible to the interior of each conductor assembly between the overlapped edges of the metal tape jacket, whereby fluid insulating material fills the permeable insulation of the conductors before and after installation of the cable.

8. A three-phase electric high-tension power cable installation comprising, in combination, a plurality of conductors; fluid-permeable insulation for each conductor; fluid insulating material filling the said fluid-permeable insulation; shielding at the surface of the permeable insulation of each conductor; a tight-fitting metal jacket comprising imperforate metal tape wrapped helically tightly about each conductor assembly, non-metallic cushioning material between the jacket and insulation of each conductor assembly, one edge of said metal tape being curved outwardly so that, when the tape is wrapped helically about the permeable insulation of a conductor assembly with the outwardly curved portion of the tape overlapping the rest of the tape, a jacket having a helically extending convolution at its exterior is provided, so that an electrical fault occurring in any one of the three phases will be confined by the metal jacket to the phase in which it originated; a fluid-tight pipe, enclosing the conductor assemblies, of sufficiently large internal diameter to permit drawing the conductors into the pipe; and a body of fluid under superatmospheric pressure filling the space between the conductor assemblies and the pipe, this fluid being accessible to the permeable insulation of the conductors between the overlapped edges of the jacket tape, so that the permeable insulation of the conductors will be filled with fluid insulation prior to and after installation of the cable.

CHARLES E. BENNETT.

REFERENCES CITED

The following references are of record in the file of this patent:

UNITED STATES PATENTS

| Number | Name | Date |
| --- | --- | --- |
| 2,034,992 | Schatzel | Mar. 24, 1936 |
| 2,222,932 | Bennett | Nov. 26, 1940 |
| 2,234,675 | Johnson | Mar. 11, 1941 |
| 2,314,694 | Dodds | Mar. 23, 1943 |
| 2,368,097 | Bennett | Jan. 30, 1945 |
| 2,390,039 | Slayter | Nov. 27, 1945 |
| 2,409,530 | Bennett | Oct. 15, 1946 |
| 2,516,747 | Bennett | July 25, 1950 |

OTHER REFERENCES

Thomas et al. Inc. and Eng. Chem., March 1940, 260/94, page 301, vol. 32, No. 3. (Copy in Library.)